(12) United States Patent
Gopal et al.

(10) Patent No.: US 6,270,677 B1
(45) Date of Patent: Aug. 7, 2001

(54) ALKALINE EFFLUENT SOLUTION TREATING PROCESS

(75) Inventors: Pradip Goolab Gopal, Alpharetta, GA (US); Dean Ginther, Shady Shores, TX (US); Randolph Alben Horton, Greenboro, NC (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/425,825

(22) Filed: Oct. 22, 1999

(51) Int. Cl.[7] ........................................... C02F 1/66
(52) U.S. Cl. .................. 210/696; 101/450.1; 210/743; 210/744; 210/749; 210/919
(58) Field of Search ................... 101/450.1, 451; 210/724, 725, 743, 744, 749, 920, 696, 919

(56) References Cited

U.S. PATENT DOCUMENTS

| | | | |
|---|---|---|---|
| 4,961,859 | * 10/1990 | Vehara et al. | 210/725 |
| 5,143,639 | * 9/1992 | Krawack | 252/162 |
| 5,298,170 | * 3/1994 | Woog | 210/719 |
| 5,338,351 | * 8/1994 | Pennaz | 101/451 |
| 5,411,596 | * 5/1995 | Pennaz | 134/26 |
| 5,454,956 | * 10/1995 | Pennaz | 210/708 |
| 5,602,089 | * 2/1997 | Pennaz | 510/171 |

OTHER PUBLICATIONS

Kodak Enviromental Services Publication No. AE–122 dated Jun., 1997–3 pages.

* cited by examiner

Primary Examiner—Peter A. Hruskoci
(74) Attorney, Agent, or Firm—Baker Botts L.L.P.

(57) ABSTRACT

A process for treating alkaline solutions obtained from lithographic printing plate processing comprises admixing at least one alkaline solution and at least one acidic solution in the presence of at least one aqueous solution to obtain a discharge solution having a pH in the range of about 5.0 to 11.5. Another process for treating alkaline solutions obtained from lithographic printing plate processing comprises admixing at least one alkaline solution and at least one aqueous waste water solution to obtain an aqueous alkaline solution, and admixing the resultant aqueous alkaline solution with at least one acidic solution to obtain a discharge solution having a pH in the range of about 5.0 to 11.5, and to control systems for such processes, and methods of controlling such processes. The alkaline solution has a pH greater than 7.0, preferably greater than about 12.5, and the acidic solution has a pH less than 7.0, preferably less than about 2.5. The alkaline, acidic and aqueous solutions are admixed in volume ratios in the range of about 1 part alkaline: 0.2–4.0 parts acidic: $\geq 50$ parts aqueous. The invention advantageously avoids the formation of unacceptable gels, sludge, or precipitate which typically occurs if the acidic solution is used to neutralize the alkaline solution.

17 Claims, 2 Drawing Sheets

ALKALINE EFFLUENT SOLUTION TREATING PROCESS

BACKGROUND OF INVENTION

This invention relates to processes for treating alkaline effluent solutions obtained from lithographic printing plate processing, systems for controlling such processes, and methods of controlling such processes. More particularly, this invention relates to processes for treating such alkaline effluent solutions by neutralizing the alkaline effluent solution in such a manner as to obtain a discharge solution which is readily handled and may be disposed of in an environmentally acceptable manner without further processing, systems for controlling such processes, and methods of controlling such processes.

Certain industrial processes generate effluent solutions and process streams which may be highly acidic or alkaline, depending upon the particular industrial process involved. For example, the processing of lithographic printing plates involves the use of at least one developer solution which is basic (i.e. having a pH above 7.0) and at least one finishing solution, gum solution, pre-bake solution or combinations thereof which are acidic (i.e. having a pH below 7.0). Consequently, such processing typically causes the generation of highly acidic and alkaline effluent solutions or process streams that must be further processed or treated before discharge into the environment, or they must be treated as hazardous waste, which adds additional cost and complexity to the overall process.

More particularly, the lithographic printing process typically employs the use of a highly alkaline developer solution having a pH greater than about 12.5 (for example, MX-1710, SILVERSTAR, and GOLDSTAR developers, having pH values of 13.0–13.5, as manufactured by Kodak Polychrome Graphics of Norwalk, Conn.), and highly acidic finishing, gum and pre-bake solutions having a pH less than about 5.0 (for example, MX 1612-1 and POLYMATIC finishers, having pH values of below 2.0, as manufactured by Kodak Polychrome Graphics of Norwalk, Conn.). The highly alkaline developer solutions are required, for example, to completely solubilize non-image portions of the exposed plates. The highly acidic solutions are required, for example, to completely convert the processed non-image portions of baked plates to uniformly hydrophilic surfaces. These solutions generate effluent or process streams which are classified as hazardous materials under the federal Resource Conservation and Recovery Act (RCRA) and applicable regulations. Thus, the discharge of these highly alkaline and acidic effluent streams into the environment is ordinarily impermissible without further treatment. Alternatives such as dilution of the effluent streams with water is often impermissible, and in any event is ordinarily costly and requires large quantities of fresh water, which is often not available. In addition, it has been found that simply neutralizing the highly alkaline effluent stream with the highly acidic effluent stream or with a separate acidic solution often causes the formation of unacceptable gels, sludge or precipitates.

Accordingly, it would be desirable to neutralize the alkaline effluent solution in such a manner as to avoid the formation of unacceptable gels, sludge, or precipitates. It is one object of this invention to provide a process for achieving such neutralization. It is one feature of this invention that the alkaline effluent stream is neutralized using at least one acidic solution to obtain a neutralized effluent stream, and that an additional aqueous solution or stream is used in the neutralization process to advantageously avoid the formation of unacceptable gels, sludge, or precipitates, thereby obtaining a neutralized discharge stream which may be discharged to the environment. It is another object of this invention to provide a control system for such a neutralization process. It is yet another object of this invention to provide a method of controlling such a process.

SUMMARY OF THE INVENTION

The invention is directed to a process for treating alkaline solutions obtained from lithographic printing plate processing comprising admixing at least one alkaline solution and at least one acidic solution in the presence of at least one aqueous solution to obtain a discharge solution having a pH in the range of about 5 to 11.5, preferably about 7.5 to 10.5. The invention is also directed to a process for treating alkaline solutions obtained from lithographic printing plate processing comprising admixing at least one alkaline solution and at least one aqueous waste water solution to obtain an aqueous alkaline solution, and admixing the resultant aqueous alkaline solution with at least one acidic solution to obtain a discharge solution having a pH in the range of about 5 to 11.5, preferably about 7.5 to 10.5. The invention is also directed to control systems for such processes, and methods of controlling such processes.

The alkaline solution has a pH greater than 7.0, preferably greater than about 12.5, and the acidic solution has a pH less than 7.0, preferably less than about 5.0, and most preferably less than about 2.5. The alkaline, acidic and aqueous solutions are admixed in volume ratios in the range of about 1 part alkaline: 0.2–4.0 parts acidic: ≧50 parts aqueous, preferably about 1 part alkaline: 0.2 . 2.5 parts acidic: ≧50 parts aqueous, respectively. In a particularly preferred embodiment, the volume ratios are about 1 part alkaline: 0.2–2.5 parts acid: 50–500 parts aqueous, and more preferably about 1 part alkaline: 0.2–2.5 parts acid: 50–250 parts aqueous.

The processes, systems and control methods may be used in the treatment of alkaline developer solution effluent streams and acidic effluent streams derived from finishing solution, gum solution, pre-bake solution or combinations thereof which are derived from the lithographic printing process.

DETAILED DESCRIPTION OF THE INVENTION

This invention is particularly applicable to the treatment of alkaline solutions or effluent streams obtained from lithographic printing plate processing, such as lithographic printing plate developer solutions and effluent streams, which are obtained from positive or computer-to-plate developer solutions and effluent streams. The lithographic printing process typically employs the use of a highly alkaline developer solution having a pH greater than about 12.5 and acidic finishing, gum and pre-bake solutions having a pH less than about 5.0. The alkaline solutions are treated to obtain a discharge solution having a pH in the range of about 5.0 to 11.5. Preferably, the treatment of the alkaline solutions does not result in the formation of unacceptable gels, sludge, or precipitates in the discharge solution. As used herein, unacceptable gels or sludge means a mixture having a marked increase in viscosity of greater than about 1.5 cp at 25 ° C. after 24 hrs. Also, unacceptable formation of precipitates means the formation of visible solids constituting greater than about 20% of filterable solids, preferably 10%, by weight of the mixture. As is well known in the art, such amounts of solids can be readily separated by using conventional filtering technologies.

Commercially available alkaline developer solutions include, but are not limited to, the following developer solutions having pH values of about 13.0–13.5 as manufactured: MX-1710 developer solution having 5–10 wt % silicic acid, potassium salt, 5–10 wt % glycerin, 1–5 wt % potassium hydroxide, and 75–85 wt % water; SILVERSTAR developer solution having 3–7 wt % silicic acid, disodium salt (also known as sodium metasilicate), and 93–97 wt % water; GOLDSTAR developer solution having 5–10 wt % silicic acid, disodium salt (also known as sodium metasilicate), 1 wt % phosphate ester, and 90–95 wt % water. All of these developers are obtainable from Kodak Polychrome Graphics (Norwalk, Conn.).

Commercially available acidic finishing, gum and pre-bake solutions include, but are not limited to, the following solutions having pH values of below 2.0, as manufactured: MX 1612 finishing solution having 80–85 wt % water, 5–10 wt % monosodium phosphate, 1–5 wt % phosphoric acid, 1–5 wt % dextrin, 1–5 wt % polyvinylpyrrolidone; 850-S finishing solution having 70–80 wt % water, 10–20 wt % dextrin, 1–5% boric acid, 1–5% amino-tri(methylene-phosphonic acid), and 1–5 wt % DOWFAX XD; ULTRAFIN finishing solution having 15–20 wt % sodium hexametaphosphate, 1–3 wt % sodium bisulfate, and 70–80 wt % water; GUARDIAN finishing solution having 3–7 wt % sodium hexametaphosphate, 3–7 wt % 2-pyrrolidinone, 1-ethenyl, homopolymer, less than 1 wt % sodium bisulfate, less than 1 wt % sodium citrate, and 80–90 wt % water; ULTRATHERM pre-bake solution having 7–12 wt % benzene, 1,1'-oxybis, tetrapropylene derivatives, sulfonated, sodium salts, 1–5 wt % 2-hydroxy-1,2,3-propanetricarboxylic acid (citric acid), and 85–90 wt % water; KODAK PRODUCTION SERIES pre-bake solution having 85–90 wt % water, and 10–15 wt % 1,1-oxybis, tetrapropylene benzene, derivatives, sulfonated, sodium salts. All of these products are obtainable from Kodak Polychrome Graphics (Norwalk, Conn.).

Figure 1:
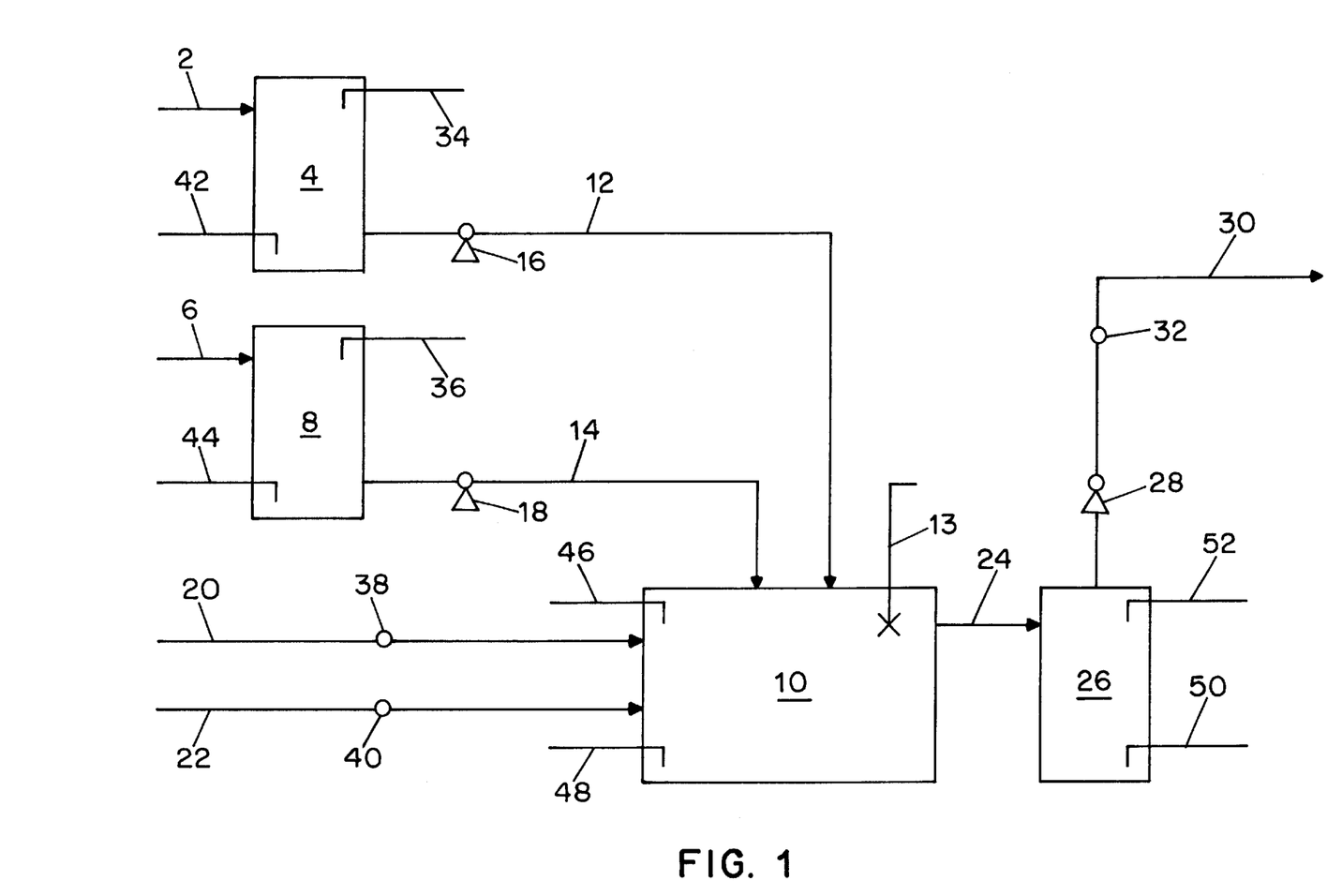
FIG. 1 sets forth a schematic diagram of one embodiment of the process of this invention.

Various embodiments of the invention are described below, with reference to the appropriate drawings. FIG. 1 depicts one preferred embodiment of the invention. In FIG. 1, an alkaline solution, such as excess lithographic plate developer solution from lithographic plate processing (not shown), is introduced via line 2 to collection tank 4. The alkaline solution has a pH above 7.0, more typically about 12.5 or above. Acidic solutions are introduced via line 6 into collection tank 8. The acidic solution can include, but is not limited to, sulfuric acid, sodium bisulfate, phosphoric acid, sodium biphosphate, citric acid, effluent finisher/gum solution used in the lithographic plate finishing process (finishing solution) or effluent pre-bake process solution used in the lithographic plate finishing process, or combinations thereof. The lithographic plate finishing process is not shown in FIG. 1. The acidic solution or solutions have a pH of less than 7.0, typically about 5.0 or less. The alkaline and acidic solutions are delivered to neutralization tank 10 via pumps 16 and 18 through lines 12 and 14, respectively. A first aqueous solution which may be water is introduced via line 20 into neutralization tank 10. A second aqueous solution which may also be water may optionally be introduced via line 22 into neutralization tank 10. These first and second aqueous solutions may be obtained from process waste water streams (not shown) from the lithographic printing plate processing, or may be obtained from fresh water sources, or a combination thereof. The alkaline, acidic and aqueous solutions may be admixed in volume ratios in the range of about 1 part (alkaline): 0.2–4.0 parts (acidic) :$\geq$50 parts (aqueous). In a particularly preferred embodiment, the volume ratios are about 1 part (alkaline): 0.2–2.5 parts (acid):$\geq$50 parts (aqueous), say about 1 part (alkaline):0.2–2.5 parts (acid):50–500 parts (aqueous), most preferably about 1 part (alkaline):0.2–2.5 parts (acid) :50–250 parts (aqueous). The volume ratios can be optimized adjusting the amount of each component after an initial test run at 1 part (alkaline):1 part (acid):50 parts (aqueous). Neutralization of the alkaline solution is accomplished in neutralization tank 10, which may additionally contain mixing means such as impeller 13, and/or baffles and the like (not shown). The neutralized solution residing in neutralization tank 10 typically has a pH in the range of about 5 to 11.5, preferably, 7.5 to 10.5. Addition of the first aqueous solution and second aqueous solution (if employed) into neutralization tank 10 prevents the formation of unacceptable gels, sludge or precipitate during neutralization. The flow rates of the various solutions may be adjusted to obtain the neutralization of the solution in neutralization tank 10 within the pH range of about 5 to 11.5, preferably about 7.5 to 10.5, as is well understood to those skilled in the art. The neutralized solution is delivered via overflow line 24 to transfer tank 26. The neutralized solution is pumped via pump 28 or gravity fed through discharge line 30 to a discharge point, such as a drain (not shown), or for further processing or recycling (not shown). A pH probe 32 may optionally be positioned in discharge line 30 or in tank 26 to monitor the pH of the neutralized solution.

The above-described process configuration may be operated in a batch, semi-batch or continuous manner, or combinations thereof. In a particularly preferred embodiment, level monitors 34 and 36 monitor the levels of alkaline and acidic solutions in tanks 4 and 8, respectively. When the levels of the solutions in tanks 4 and 8 have reached predetermined levels, the pumps 16 and 18 will respectively pump the alkaline and acidic solutions into neutralization tank 10. However, to avoid formation of unacceptable gels, sludge or precipitates, these pumps will not engage unless the first aqueous solution in line 20 and the second aqueous solution in line 22 (if used) are already flowing into neutralization tank 10. Flow meters 38 and 40 monitor the flow through lines 20 and 22, respectively. Assuming that aqueous solution is flowing in lines 20 and 22 (if used) to neutralization tank 10, the pumps 16 and 18 will deliver alkaline and acidic solutions, respectively, to the neutralization tank 10. The pumps 16 and 18 may operate in continuous or pulsed mode. For example, in one embodiment the pumps 16 and 18 may initially engage when flow meter 38 (and flow meter 40, if used) indicate flow of aqueous solution to neutralization tank 10. Pumps 16 and 18 may shut off after a preset time, and then restart while aqueous solution flows to neutralization tank 10. In this "pulsed mode" method of operation, pumps 16 and 18 may cycle on and off two or more times as long as aqueous solution flows to neutralization tank 10. The optional pH probe 32 may also be employed to provide feedback control to the system to insure that the pH of the neutralized solution flowing in discharge line 30 is in the desired range. Additional control features such as low level alarms for tanks 4, 8 and 10, and other process control devices well known to those skilled in the art may also be used.

Various control features, devices and schemes may be used to achieve optimal neutralization. For example, low level sensor 44 monitors the level of acidic solution in tank 8. If the level of acidic solution in tank 8 drops below a preset level, an audible alarm will sound and an indicator light will illuminate. Additionally, if desired, the triggering of a low level indication in tank 8 may prevent delivery of additional alkaline solution from tank 4 into neutralization tank 10. Similarly, low level sensor 42 monitors the level of alkaline solution in tank 4. If tank 4 has an acceptable level of alkaline solution, the control system will permit and automatically deliver alkaline and acidic solutions from tanks 4 and 8, respectively, into neutralization tank 10. In one configuration, there is no alarm or indicator triggered if the level of alkaline solution drops below a preset level, as measured by low level 42. However, an alarm, indicator, or combinations thereof are activated if the alkaline solution level in tank 4 rises above a preset level, as measured by level monitor 34. In another configuration, an alarm or indicator or both are triggered if the level of alkaline solution drops below a preset level, as measured by low level sensor 42. As long as tank 4 has an alkaline solution level that is acceptable, the control system will automatically permit desired amounts of alkaline and acidic solutions to be delivered via pumps 16 and 18 to neutralization tank 10. Flow meter 38 monitors the flow of aqueous solution in line 20, to insure that the flow is between desired preset maximum and minimum levels. Similarly, if line 22 is used, flow meter 40 monitors the flow of aqueous solution in line 22, to insure that the flow is between desired preset maximum and minimum levels. Control valves may be integrated into the system to control the flow of the alkaline, acidic and aqueous solutions.

Neutralization tank 10 may optionally contain low level sensor 48 and high level sensor 46. Similarly, transfer tank 26 may optionally contain low level sensor 50 and high level sensor 52. In one configuration, overflow from neutralization tank 10 flows into transfer tank 26 via overflow line 24. If sensor 52 indicates a high level, pump 28 is engaged to empty tank 26. If sensor 50 indicates a low level in tank 26, pump 28 is disengaged.

Impeller 13 is driven by a mix motor (not shown). In one configuration, the mix motor is activated when aqueous solution is delivered to the neutralization tank 10 via lines 20, and optionally line 22. If the delivery of aqueous solution, as measured by flow meters 38 and 40, is interrupted for more than a predetermined amount of time, (e.g. ten minutes), the mix motor is deactivated by the control system.

If desired, optional pH probe 32 in discharge line 30 provides additional input for the control and alarm system. In the event of a preset alarm condition, such as discharge line solution pH outside of acceptable range (e.g. 5.0 to 11.5), an alarm such as an audible alarm, an indicator light or both will be activated. This may also trigger disabling of pumps 16 and 18, to prevent the delivery of additional alkaline and acidic solution to neutralization tank 10 until the alarm condition is remedied.

In one preferred embodiment, the control system is configured such that high level of acidic solution in tank 8 triggers the alarm system. Optionally, either or both of the following conditions may additionally trigger the alarm system: (1) overflow of transfer tank 26; and (2) pH monitor 32 signals that the pH of discharge solution in line 30 is unacceptable.

The control system may have additional control schemes, devices, and other configurations as are well known to those skilled in the art. For example, in one preferred configuration, when an alarm condition occurs, the alarm light illuminates and an audible alarm sounds. An alarm mute switch is provided to silence the audible alarm. When the switch is activated, the audible alarm shuts off for fifteen minutes. If the alarm condition still exists after fifteen minutes, the audible alarm is reactivated.

The control system may be operated via a circuit board in either a manual or automatic mode of operation. A switch on the circuit board is used to select between the manual and automatic modes of operation. In a preferred embodiment, the automatic mode is the normal mode of operation. In this mode, the alkaline and acid solution pumps (16 and 18, respectively) are active and all alarm systems are active. In the manual mode the pumps are disabled but all alarm systems are active. This mode may be used when alarm monitoring is needed but alkaline and acid solution metering into neutralization tank 10 is not. In one particularly preferred embodiment, the control system is employed in conjunction with an operator interface, as is well known to those skilled in the art. Such an interface may include a keypad, status lights, a digital display, and other features well known to those skilled in the art.

Figure 2:
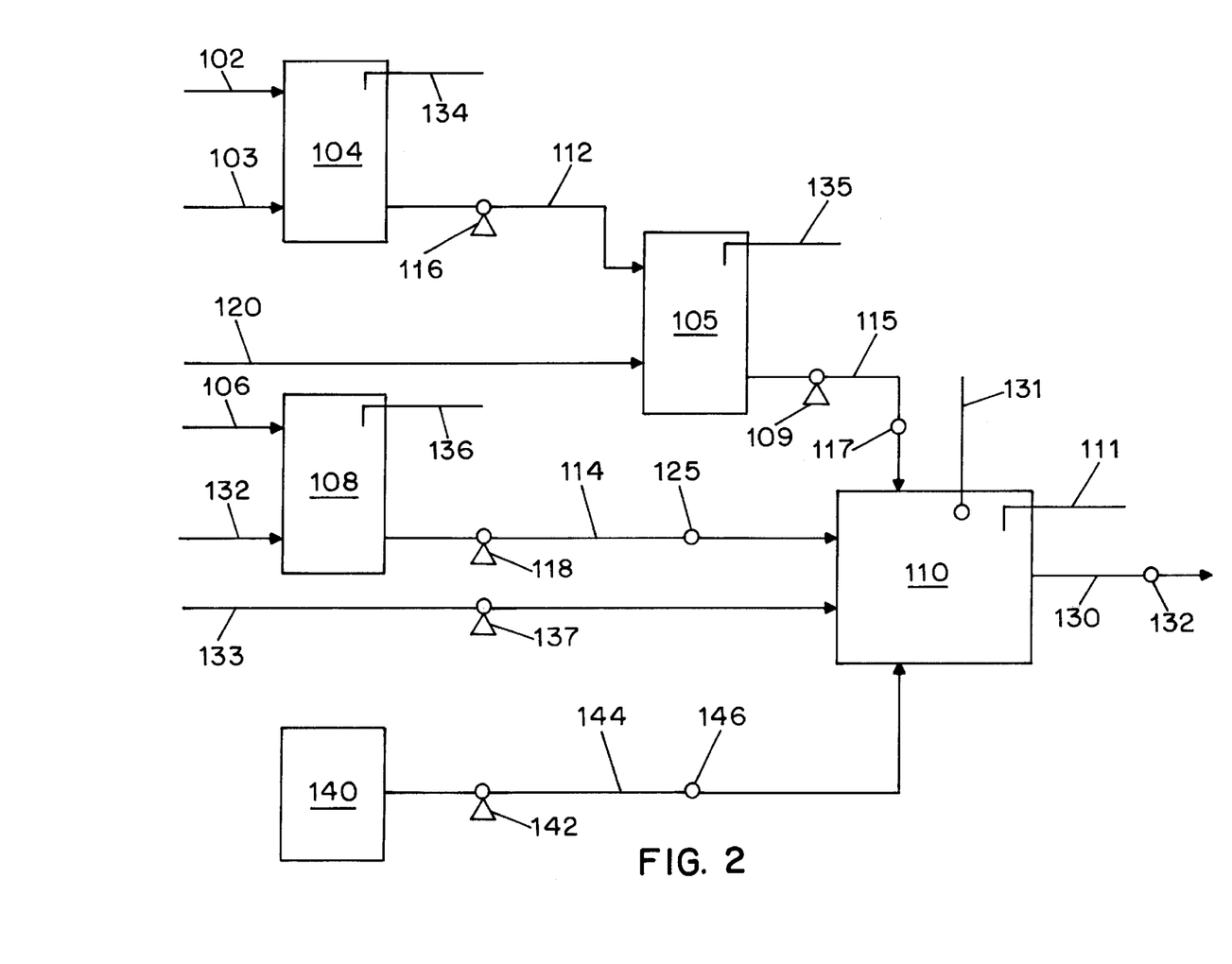
FIG. 2 sets forth a schematic diagram of another embodiment of the process of this invention.

Another embodiment of the invention is set forth schematically in FIG. 2. In FIG. 2, alkaline solution such as excess lithographic plate developer solution from lithographic plate processing (not shown) is introduced via line 102 to collection tank 104. The alkaline solution has a pH above 7.0, more typically about 12.5 or above. The alkaline solution residing in tank 104 may be diluted by introduction of an aqueous process waste water stream 103 into tank 104. Alternatively, or conjunctively, the alkaline solution may be pumped via pump 116 through line 112 to dilution tank 105, which receives aqueous process waste water via line 120. The aqueous process waste water solutions delivered via lines 103 and 120 may be obtained from process waste water streams (not shown) from lithographic printing plate processing, or other process waste water streams, or a combination thereof, but must be obtained from process waste water streams, as opposed to fresh water sources. Whether dilution of the alkaline solution occurs in tank 104 or tank 105, or both, an aqueous alkaline solution is obtained.

Acidic solutions, such as sulfuric acid, citric acid, phosphoric acid and salts thereof (for example 6% by weight of $NaH_2PO_4$ solution), effluent gum solution, effluent finishing solutions used in the lithographic plate finishing process or effluent pre-bake solutions used in the lithographic process (not shown), or combinations thereof, are introduced via line 106 into collection tank 108. The acidic solution or solutions have a pH of less than 7.0, more typically, about 5.0 or less. The acidic solution residing in tank 108 may be diluted by introduction of an aqueous solution, such as a process waste water stream, via line 132 into tank 108. The acidic solution (diluted or undiluted) is transferred via pump 118 through line 114 to neutralization tank 110. The diluted alkaline solution is transferred via pump 109 through line 115 to neutralization tank 110. Flow meter 117 may be used to monitor the flow of aqueous alkaline solution into neutralization tank 110. Neutralization of the alkaline solution is accomplished in neutralization tank 110, which may additionally contain mixing means such as impellers, baffles and the like (not shown). Optionally, additional acidic solution may be stored in tank 140 and pumped via pump 142 and line 144 into neutralization tank 110. The additional acidic solution can include, but is not limited to, sulfuric acid, citric acid, phosphoric acid, salts thereof, and mixtures thereof (e.g. 6% by weight $NaH_2PO_4$ solution and/or 10% by weight $NaHSO_4$). The aqueous alkaline solution is admixed with the acidic solution to obtain a solution having a volume ratio of about 1 part alkaline:0.2–4.0 parts acidic:$\geq$50 parts aqueous. In a particularly preferred embodiment, the volume ratios are about 1 part (alkaline):0.2–2.5 parts (acid):$\geq$50 parts (aqueous), say about 1 part (alkaline):0.2–2.5 parts (acid):50–500 parts (aqueous), most preferably about 1 part (alkaline):0.2–2.5 parts (acid): 50–250 parts (aqueous). Flow meter 146 may be used to monitor the flow of the additional acidic solution via line 144 into neutralization tank 110. Additional process waste water may be delivered via line 133 and pump 137 to tank 110, if necessary. Addition of the diluted aqueous alkaline solution into neutralization tank 110 prevents the formation of unacceptable gels, sludge and precipitate during neutralization. The flow rates of the various solutions may be adjusted to obtain the neutralization of the solution in neutralization tank 110 within the pH range of about 5 to about 11.5, preferably about 7.5 to about 10.5, as is well understood to those skilled in the art. The neutralized solution is discharged from neutralization tank 110 via discharge line 130 to a discharge point such as a drain (not shown), or for further processing or recycling (not shown). Various attendant equipment such as pumps, overflow tanks, etc. (not shown) may also be employed. The pH probes 131 and 132 may optionally be positioned respectively in neutralization tank 110 or discharge line 130, or both to monitor the pH of the neutralized solution.

The above-described process configuration may also be operated in a batch, semi-batch or continuous manner, or combinations thereof. In a particularly preferred embodiment, level monitor 134 monitors the level of alkaline or aqueous alkaline solution in tank 104, level monitor 135 monitors the level of aqueous alkaline solution in tank 105, and level monitor 136 monitors the level or acidic or aqueous acidic solution in tank 108. When the levels of solution in tanks 104 and 105 have reached predetermined levels, the pumps 116 and/or 109, respectively, will pump the alkaline or aqueous alkaline solutions into neutralization tank 110. Similarly, level monitor 136 monitors the level of acidic solution (diluted or undiluted) in tank 108, and when the level of solution in tank 108 has reached a predetermined level, pump 118 will pump the acidic or aqueous acidic solution into neutralization tank 110.

In one particularly preferred embodiment, alkaline excess lithographic plate developer solution, typically having a pH of about 12.5 or above, is diluted by admixture with process waste water obtained from lithographic printing plate processing. Acidic solution obtained from the lithographic printing plate process, such as effluent gum and pre-bake solution, typically having a pH of 5.0 or less, is admixed with the diluted alkaline solution in the neutralization tank 110. Tank 110 has a level monitor 111 which monitors the level of solution in the tank 110. Once the level of solution in tank 110 has reached a predetermined level, pumps 118 and/or 142 are activated to introduce acidic solution into neutralization tank 110. The pH of the discharge solution in tank 110 within the desired range of about 5 to 11.5, preferably 7.5 to 10.5, as measured by pH probe 131. This probe also provides feedback signal to a controller (not shown) which adjusts the flow rates of the various streams (i.e. aqueous, acidic, alkaline or combinations thereof) to maintain the pH of the discharge solution in the desired range of about 5–11.5, preferably 7.5 to 10.5. After proper mixing in neutralization tank 110 via an impeller or the like (not shown), the discharge solution having a pH in the range of about 5 to 11.5, preferably 7.5 to 11.5 is discharged via line 130 via gravity draining, pumping via discharge pump (not shown) or other suitable means well known to those skilled in the art.

The various equipment used in the invention should be constructed from suitable materials. For example, the various pumps should be constructed from polypropylene, EPT, or other materials suitable for use with highly acidic and alkaline solutions, and the various tanks, piping, valving, etc. should be constructed from polyethylene, PVC, polypropylene or other materials suitable for use with highly acidic and alkaline solutions.

The invention will be illustrated by the following examples, which are meant to be illustrative and not to limit the invention in any way.

EXAMPLES 1–5

Comparative

To demonstrate the problem associated with the neutralization of highly alkaline lithographic printing process developer solutions, 1 part of MX 1710 developer was neutralized with various acidic solutions. The results, as set forth in Table 1, demonstrate that the neutralization of highly alkaline developer solution by acidic solutions without the presence of additional amounts of water causes the formation of unacceptable gels, sludge and/or precipitates.

TABLE 1

| EXAMPLE | PARTS DEVELOPER (BASE) | PARTS FINISHER/ ACID | GEL/ SLUDGE FORMED? |
|---|---|---|---|
| 1 | 1 Part MX 1710 | 1 Part Finisher MX 1612-1 | Yes |
| 2 | 1 Part MX 1710 | 1 Part MX 1540 Finisher | Yes |
| 3 | 1 Part MX 1710 | 1 Part Citric Acid | Yes |
| 4 | 1 Part MX 1710 | 1 Part Sulfuric Acid | Yes |
| 5 | 1 Part MX 1710 | 1 Part Polymatic Developer | Yes |

EXAMPLES 6–10

Examples 6–7 were baseline experiments to determine the pH of fresh water and lithographic printing process waste water, respectively. As shown in Table 2, Examples 8–10 demonstrate the embodiments of the invention in which the highly alkaline solution obtained from the lithographic printing process (MX 1710 developer) was neutralized by an acidic solution obtained from the lithographic printing process (KODAK Finisher (Example 8), MX 1540 (Example 9) or MX 1612-1 (Example 10)) in the presence of wastewater, and the formation of unacceptable gels, sludge and/or precipitates was avoided.

TABLE 2

| Example | Parts Developer (Base) | Parts Acid/ Finisher | Parts Waste Water | pH | Gel/ Sludge Formed |
|---|---|---|---|---|---|
| 6 | 0 | 0 | Fresh Water | 6.2 | No |
| 7 | 0 | 0 | 210 | 9.2 | No |
| 8 | 1 Part MX 1710 Developer | 1 part Kodak Finisher | 210 | 6.3 | No |
| 9 | 1 Part MX 1710 Developer | 1 Part MX 1540 | 210 | 3.9 | No |
| 10 | 1 Part MX 1710 Developer | 1 Part MX 1612-1 Finisher | 210 | 10.1 | No |

EXAMPLES 11–16

Example 11 was a baseline experiment conducted to measure the pH and temperature of the lithographic printing process wastewater used in Examples 12–16. In Examples 12–16, highly alkaline developer solution was neutralized with acidic solution derived from the lithographic printing process (i.e. finisher, prebake, gum, and sodium bisulfate solutions, or combinations thereof) in the presence of lithographic printing plate process wastewater. The volume ratios of alkaline solution: acidic solution: wastewater in Examples 12–16 were 1 (alkaline):0.92 (acidic):55.8 (aqueous). As shown in Table 3, Examples 12–16 achieved neutralization at pH's in the range of 9.3–11.3. No unacceptable gels, sludge and/or precipitates were observed in Examples 12–16.

TABLE 3

| Example | Developer (Base) pH | Finisher/ prebake/ gum/sodium bisulfate solution pH | Neutralized Solution pH | Neutralized Solution Temperature (° F.) |
|---|---|---|---|---|
| 11 | 0 | 0 | 7.8 (Water only) | 66.3 |
| 12 | 13.3 | 0.8 | 9.3 | 68.3 |

TABLE 3-continued

| Example | Developer (Base) pH | Finisher/ prebake/ gum/sodium bisulfate solution pH | Neutralized Solution pH | Neutralized Solution Temperature (° F.) |
|---|---|---|---|---|
| 13 | 13.4 | 1.0 | 9.4 | 68.3 |
| 14 | 13.3 | 2.6 | 11.0 | 64.0 |
| 15 | 13.3 | 1.8 | 11.2 | 66.1 |
| 16 | 13.3 | 1.8 | 11.3 | 65.5 |

EXAMPLES 17–37

Examples 17–37 illustrate the effectiveness of using acidic solutions, other than effluent finishing process solutions or effluent pre-bake process solutions, to treat the alkaline developer solutions. These acidic solutions can be used alone or in combination with the effluent finishing process solutions and/or effluent pre-bake process solutions. Tables 4–8 illustrate the treatment of effluent MX 1710 Developer solution with various amounts of citric acid, $NaH_2PO_4$, $H_3PO_4$, $NaHSO_4$, and sulfuric acid, respectively. In each case, the resulting mixtures were observed over a 24 hour period for formation of unacceptable gels, sludge, coagulates, or precipitates. Unacceptable precipitates are visible solids that constitute greater than 10% by weight of the solution when filtered. Coagulates describe a mixture that is in between a precipitate and a gel/sludge, i.e., having increased viscosity but lacking the coherent adhesion of the gel/sludge.

Table 4 shows that citric acid is effective in treating effluent MX 1710 Developer solution. The amount of citric acid was determined by titrating the effluent MX 1710 Developer with enough citric acid to obtain a pH of about 7.0 for the final mixture, i.e., developer, acid and effluent water. The data shows that only a 50× dilution with water is required when using an appropriate amount of citric acid to obtain a clear discharge solution.

TABLE 4

| Example | Vol. of effluent MX 1710 Developer (ml) | Vol. of 10 wt % citric acid (ml) | Vol. of plate processing effluent water (ml) | Dilution of Developer | Effect 15 min | 60 min | 24 hrs. | pH |
|---|---|---|---|---|---|---|---|---|
| 17 | 10 | 12 | 100 | 10 | ppt.* | ppt.* | ppt.* | 7.0 |
| 18 | 2 | 2.5 | 100 | 50 | clear | clear | clear | 7.0 |

*precipitate formed

Table 5 shows that sodium biphosphate ($NaH_2PO_4$) is also effective in treating effluent MX 1710 Developer solution. The amount of sodium biphosphate was determined by titrating the effluent MX 1710 Developer with enough sodium biphosphate to obtain a pH of 7.0 for the final mixture, i.e., developer, acid and effluent water. The data shows that a 100× dilution with water is required when using an appropriate amount of sodium biphosphate to obtain a clear discharge solution.

TABLE 5

| Example | Vol. of effluent MX 1710 Developer (ml) | Vol. of 10 wt % NaH$_2$PO$_4$ (ml) | Vol. of plate processing effluent water (ml) | Dilution of Developer | Effect 5 min | 15 min | 60 min | 24 hrs | pH |
|---|---|---|---|---|---|---|---|---|---|
| 19 | 10 | 21.9 | 0 | 0 | ppt.* | gel | gel | solid | 7.04 |
| 20 | 10 | 21.9 | 50 | 5 | ppt.* | ppt.* | gel | gel | 7.0 |
| 21 | 10 | 16.7 | 100 | 10 | ppt.* | ppt.* | ppt.* | ppt.* | 7.0 |
| 22 | 2 | 3.5 | 100 | 50 | ppt.* | ppt.* | ppt.* | ppt.* | 6.8 |
| 23 | 1 | 1.75 | 100 | 100 | clear | clear | clear | clear | 6.9 |

*precipitate formed

Table 6 shows that phosphoric acid (H$_3$PO$_4$) is also effective in treating effluent MX 1710 Developer solution. The amount of phosphoric acid was determined by titrating the effluent MX 1710 Developer with enough phosphoric acid to obtain a pH of about 7.0 for the mixture, i.e., developer, acid and effluent water. The data shows that a 100× dilution with water is required when using an appropriate amount of phosphoric acid to obtain a clear discharge solution.

TABLE 6

| Example | Vol. of effluent MX 1710 Developer (ml) | Vol. of 10 wt % H$_3$PO$_4$ (ml) | Vol. of plate processing effluent water (ml) | Dilution of Developer | Effect 15 min | 60 min | 24 hrs. | pH |
|---|---|---|---|---|---|---|---|---|
| 24 | 10 | 15.1 | 100 | 10 | ppt.* | ppt.* | gel | 7.0 |
| 25 | 2 | 3.6 | 100 | 50 | ppt.* | ppt.* | gel | 7.0 |
| 26 | 1 | 1.9 | 100 | 100 | clear | clear | clear | 7.0 |

Table 7 shows that sodium bisulfate (NaHSO$_4$) is also effective in treating effluent MX 1710 Developer solution. The amount of sodium bisulfate was determined by titrating the effluent MX 1710 Developer with enough sodium bisulfate to obtain a pH of about 7.0 for the final mixture, i.e., developer, acid and effluent water. The data shows that a 100× dilution with water is required when using an appropriate amount of sodium bisulfate to obtain a clear discharge solution.

TABLE 7

| Example | Vol. of effluent MX 1710 Developer (ml) | Vol. of 10 wt % NaH$_2$SO$_4$ (ml) | Vol. of plate processing effluent water (ml) | Dilution of Developer | Effect 5 min | 15 min | 60 min | 24 hrs | pH |
|---|---|---|---|---|---|---|---|---|---|
| 27 | 10 | 15.7 | 0 | 0 | gel | gel | gel | gel | 6.96 |
| 28 | 10 | 15.7 | 50 | 5 | ppt.* | coag.$^a$ | gel | gel | 7.0 |
| 29 | 10 | 16.7 | 100 | 10 | ppt.* | ppt.* | ppt.* | gel | 7.0 |
| 30 | 2 | 3.1 | 100 | 50 | ppt.* | ppt.* | ppt.* | gel | 7.0 |
| 31 | 1 | 1.6 | 100 | 100 | clear | clear | clear | clear | 7.0 |

*precipitate formed
$^a$unacceptable coagulate formed

Table 8 shows that sulfuric acid is somewhat effective in treating effluent MX 1710 Developer solution. The amount of sulfuric acid was determined by titrating the effluent MX 1710 Developer with enough sulfuric acid to obtain a pH of about 7.0 for the final mixture, i.e., developer, acid and effluent water. The data shows that discharge solutions containing precipitate was obtained upon treatment with an appropriate amount of sulfuric acid and 50× and 10× dilutions with water, respectively.

TABLE 8

| Example | Vol. of effluent MX 1710 Developer (ml) | Vol. of 10 wt % sulfuric acid (ml) | Vol. of plate processing effluent water (ml) | Dilution of Developer | Effect | | | | pH |
|---|---|---|---|---|---|---|---|---|---|
| | | | | | 5 min | 15 min | 60 min | 24 hrs | |
| 32 | 10 | 6.8 | 0 | 0 | gel | gel | gel | gel | 7.0 |
| 33 | 10 | 6.8 | 50 | 5 | coag.$^a$ | coag.$^a$ | coag.$^a$ | coag.$^a$ | 7.0 |
| 34 | 10 | 6.8 | 100 | 10 | coag.$^a$ | coag.$^a$ | coag.$^a$ | gel | 7.0 |
| 35 | 10 | 7.5 | 100 | 10 | ppt.* | ppt.* | ppt.* | gel | 7.0 |
| 36 | 2 | 1.5 | 100 | 50 | ppt.* | ppt.* | ppt.* | ppt.* | 7.0 |
| 37 | 1 | 0.7 | 100 | 100 | clear | clear | ppt.* | ppt.* | 7.0 |

*precipitate formed
$^a$unacceptable coagulate formed

Although this invention has been illustrated by reference to specific embodiments, it will be apparent to those skilled in the art that various changes and modifications may be made which clearly fall within the scope of this invention.

We claim:

1. A process for treating an effluent alkaline solution obtained from lithographic printing plate processing comprising admixing at least one alkaline solution and at least one acidic solution in the presence of at least one aqueous solution in a volume ratio in the range of about 1 part alkaline:0.2–4.0 parts acidic:≧50 parts aqueous, thereby neutralizing the alkaline solution to avoid the formation of unacceptable gels, sludge, or precipitates, and to obtain a neutralized discharge solution having a pH in the range of about 5.0 to 11.5.

2. The process of claim 1, wherein the aqueous solution is a waste water stream obtained from lithographic printing plate processing.

3. The process of claim 1, wherein the alkaline solution has a pH greater than about 12.5.

4. The process of claim 1, wherein the acidic solution has a pH of less than about 5.0.

5. The process of claim 1, wherein the volume ratio is about 1:0.2–2.5:≧50.

6. The process of claim 1, wherein the volume ratio is about 1:0.2–2.5:50–500.

7. A process for treating an alkaline solution obtained from lithographic printing plate processing comprising admixing at least one alkaline solution and at least one aqueous waste water solution to obtain an aqueous alkaline solution, and admixing the resultant aqueous alkaline solution with at least one acidic solution in a volume ratio in the range of about 1 part alkaline:0.2–4.0 parts acidic:≧50 parts aqueous, thereby neutralizing the alkaline solution to avoid the formation of unacceptable gels, sludge, or precipitates, and to obtain a neutralized discharge solution having a pH in the range of about 5 to 11.5.

8. The process of claim 7, wherein the aqueous waste water solution is a waste water stream obtained from lithographic printing plate processing.

9. The process of claim 7, wherein the alkaline solution has a pH greater than about 12.5.

10. The process of claim 7, wherein the acidic solution has a pH of less than about 5.0.

11. The process of claim 7, in which the volume ratio is 1:0.2–2.5:≧50.

12. The process of claim 7, in which the volume ratio is 1:0.2–2.5:50–500.

13. A process for treating an alkaline effluent solution obtained from lithographic printing plate processing, comprising admixing the alkaline effluent solution and at least one acidic solution in the presence of at least one aqueous solution which is a waste water stream obtained from lithographic printing plate processing in a volume ratio of about 1 part alkaline:0.2–4.0 parts acidic:≧50 parts aqueous, thereby neutralizing the alkaline solution to avoid the formation of unacceptable gels, sludge, or precipitates, and to obtain a neutralized discharge solution having a pH in the range of about 5.0 to 11.5.

14. A process for treating an alkaline effluent solution obtained from lithographic printing plate processing, comprising admixing the alkaline effluent solution and at least one aqueous waste water solution which is a waste water stream obtained from lithographic printing plate processing to obtain an aqueous alkaline solution, and admixing the resultant aqueous alkaline solution with at least one acidic solution in a volume ratio of about 1 part alkaline:0.2–4.0 parts acidic:≧50 parts aqueous, thereby neutralizing the alkaline solution to avoid the formation of unacceptable gels, sludge, or precipitates, and to obtain a neutralized discharge solution having a pH in the range of about 5.0 to 11.5.

15. A method of controlling a process for treating an alkaline effluent solution obtained from lithographic printing plate processing comprising:

providing at least one alkaline solution to a first holding tank having means for controlling and monitoring the level of alkaline solution contained therein;

providing at least one acidic solution to a second holding tank having means for controlling and monitoring the level of acidic solution contained therein;

providing a neutralization tank having means for controlling and monitoring the level of neutralized solution contained therein;

providing means for delivering and controlling the flow of the alkaline and aqueous solutions to the neutralization tank;

providing means for monitoring the pH of neutralized solution;- providing at least one aqueous solution to the neutralization tank, together with means for controlling the flow of the aqueous solution; and introducing the alkaline and acidic solutions into the neutralization tank in the presence of the aqueous solution at a volume ratio of about 1 part alkaline:0.2–4.0 parts acidic:$\geqq 50$ parts aqueous, thereby neutralizing the alkaline solution to avoid the formation of unacceptable gels, sludge, or precipitates, and to obtain a neutralized solution having a pH in the range of about 5.0 to 11.5.

16. The method of claim 15, additionally comprising:

obtaining a signal from the pH monitoring means;

providing the signal to the flow control means for the alkaline, acidic and aqueous solutions, thereby maintaining the neutralized solution in the pH range of about 5.0 to 11.5.

17. A method of controlling a process for treating an alkaline effluent solution obtained from lithographic printing plate processing comprising:

providing at least one aqueous alkaline solution to a neutralization tank comprising means for monitoring the level of discharge solution contained therein and means for measuring the pH of the discharge solution contained therein;

measuring the pH of the discharge solution in the neutralization tank, and converting the measurement to a signal;

transmitting the signal to means for introducing at least one acidic solution into the neutralization tank, thereby causing such means to introduce acidic solution into the neutralization tank in a volume ratio of about 1 part alkaline:0.2–4.0 parts acidic:$\geqq 50$ parts aqueous, thereby neutralizing the aqueous solution to avoid the formation of unacceptable gels, sludge, or precipitates, and maintaining the pH of the neutralized discharge solution at a pH of about 5.0 to 11.5.

* * * * *

UNITED STATES PATENT AND TRADEMARK OFFICE
CERTIFICATE OF CORRECTION

PATENT NO. : 6,270,677 B1  
DATED : August 7, 2001  
INVENTOR(S) : Gopal et al.

Page 1 of 1

It is certified that error appears in the above-identified patent and that said Letters Patent is hereby corrected as shown below:

Title page,  
Item [56], References Cited, OTHER PUBLICATIONS,  
"Enviromental" should read -- Environmental --  
Item [75], Inventor(s), "Greenboro" should read -- Greensboro --

Column 14,  
Line 67, "solution;-" should read -- solution; --

Column 2,  
Line 14, "apH" should read -- a pH --  
Line 32, "0.2 . 2.5" should read -- 0.2–2.5 --

Column 7,  
Line 19, "0.24.0" should read -- 0.2–4.0 --

Column 9,  
Table 2, "Formed" should read -- Formed? --; and "3.9" should read -- 8.9 --

Column 11,  
Table 7, "NaH$_2$SO$_4$" should read -- NaHSO$_4$ --

Signed and Sealed this

Seventh Day of May, 2002

*Attest:*

*Attesting Officer*

JAMES E. ROGAN  
*Director of the United States Patent and Trademark Office*